US012652214B2

(12) United States Patent
Abate et al.

(10) Patent No.: US 12,652,214 B2
(45) Date of Patent: Jun. 9, 2026

(54) SYSTEMS AND METHODS FOR INFORMATION TECHNOLOGY INCIDENT SOLUTIONS

(71) Applicant: Fortinet, Inc., Sunnyvale, CA (US)

(72) Inventors: Jason Abate, Chicago (IL); Shabbir Karimi, Chicago (IL)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/173,787

(22) Filed: Feb. 11, 2021

(65) Prior Publication Data

US 2022/0255792 A1 Aug. 11, 2022

(51) Int. Cl.
*H04L 41/0654* (2022.01)
*G06F 16/2457* (2019.01)
(52) U.S. Cl.
CPC .... *H04L 41/0654* (2013.01); *G06F 16/24578* (2019.01)

(58) Field of Classification Search
CPC .................................................. H04L 41/0654
See application file for complete search history.

(56) References Cited

U.S. PATENT DOCUMENTS

| | | | | |
|---|---|---|---|---|
| 9,424,525 | B1 * | 8/2016 | Byrne | H04L 67/104 |
| 2013/0097179 | A1 * | 4/2013 | Moshrefi | G06F 16/9535 |
| | | | | 707/748 |
| 2017/0103329 | A1 * | 4/2017 | Reddy | G06N 5/04 |
| 2017/0140315 | A1 * | 5/2017 | Cao | G06Q 10/06311 |
| 2019/0149617 | A1 * | 5/2019 | Gao | H04L 67/34 |
| | | | | 709/223 |
| 2019/0347282 | A1 * | 11/2019 | Cai | G06N 5/022 |
| 2020/0184428 | A1 * | 6/2020 | Kurian | G06F 16/248 |

* cited by examiner

*Primary Examiner* — Dhairya A Patel
*Assistant Examiner* — Eui H Kim
(74) *Attorney, Agent, or Firm* — Jaffery Watson Hamilton & DeSanctis LLP

(57) ABSTRACT

Various approaches for providing network maintenance and health monitoring. In some cases, some approaches include systems, methods, and/or devices embodiments that provide for receiving and cataloging network incidents and in providing proposed solutions to mitigate the network incidents.

16 Claims, 4 Drawing Sheets

SYSTEMS AND METHODS FOR INFORMATION TECHNOLOGY INCIDENT SOLUTIONS

COPYRIGHT NOTICE

FIELD

Embodiments discussed generally relate to network maintenance and health monitoring. In some cases, embodiments discussed relate to systems and methods for receiving and cataloging network incidents and in providing proposed solutions to mitigate the network incidents.

BACKGROUND

It is not uncommon for large operations teams, especially in a distributed environment, to oversee network and network related functionality. The size of the organizations makes it challenging to coordinate knowledge around solutions to common incidents that arise with regularity. In their environments, the same problems often encounter repeatedly, with different team members having to identify, triage, troubleshoot and resolve the same problem over and over prior to a permanent solution being put in place. This applies even more to managed service providers, who are running similar but slightly different environments for each of their customers.

Thus, there exists a need in the art for more advanced approaches, devices and systems for monitoring and addressing network functionality.

SUMMARY

Various embodiments provide systems and methods for network maintenance and monitoring. In some cases, embodiments discussed relate to systems and methods for receiving and cataloging network incidents and in providing proposed solutions to mitigate the network incidents.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
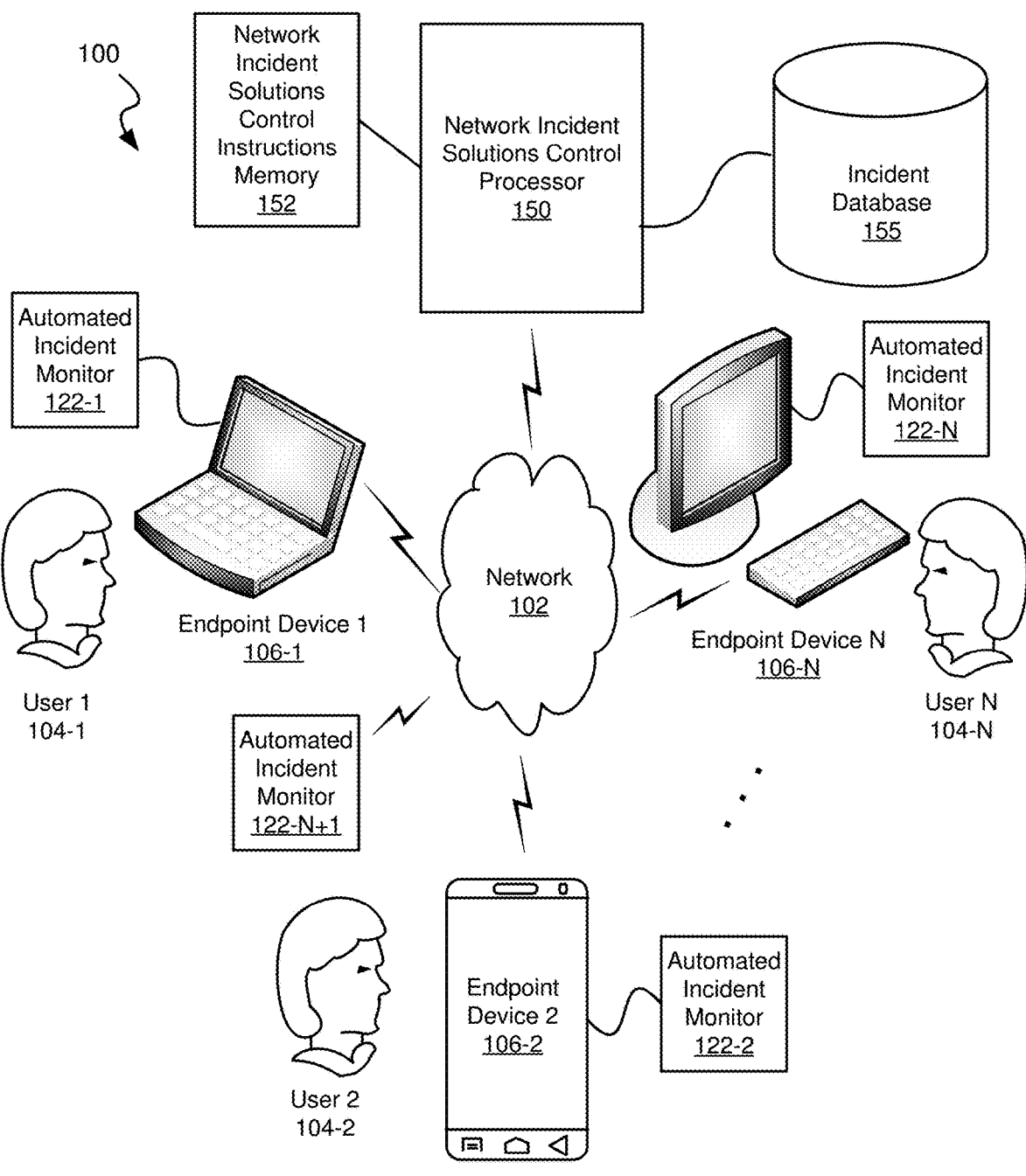
FIGS. 1A-B illustrate a network architecture in accordance with some embodiments.

Various embodiments provide systems and methods for network maintenance and monitoring. In some cases, embodiments discussed relate to systems and methods for receiving and cataloging network incidents and in providing proposed solutions to mitigate the network incidents.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the afore-mentioned definition.

If the specification states a component or feature "may", "can", "could", or "might" be included or have a character-istic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclo-sure, and may be included in more than one embodiment of the present disclosure. Importantly, such phrases do not necessarily refer to the same embodiment.

The phrase "network element malfunction" is used in its broadest sense to mean any malfunction within a network environment including, but not limited to: a failure of a network server; a failure of a cloud based service; a failure of an endpoint device; a failure of a software application executing on a device in the network such as, for example, a network server or an endpoint device; and/or a failure of a downstream provider. Based upon the disclosure provided herein, one of ordinary skill in the art will recognize a myriad of malfunctions that may be considered a network element malfunction Example embodiments will now be described more fully hereinafter with reference to the accompanying drawings, in which exemplary embodiments are shown. This disclosure may, however, be embodied in many different forms and should not be construed as limited to the embodiments set forth herein.

Thus, for example, it will be appreciated by those of ordinary skill in the art that the diagrams, schematics, illustrations, and the like represent conceptual views or processes illustrating systems and methods embodying vari-ous aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods for distributing network intelligence. Such methods include: receiving, by a processing device, an indication of a network element mal-function, where the indication of the network element mal-function includes at least a first data and a second data about the network element malfunction; accessing a plurality of solutions from an incident database; scoring, by the pro-cessing device, each of the plurality of solutions relative to the indication of a network element malfunction based upon a similarity of at least the first data and the second data to corresponding information associated with each of the plu-rality of solutions to yield a plurality of scores, where each of the plurality of scores corresponds to a respective one of the plurality of solutions; selecting, by the processing device, a subset of the plurality of solutions based upon the plurality of scores; and providing the subset of the plurality of solutions, by the processing device via a network, to a user.

In some instances of the aforementioned embodiments, the methods further include: receiving from the user, by the processing device, at least one indication of success with one of the plurality of solutions; and storing the at least one indication of success in the incident data based associated with the solution to which the indication of success corre-sponds. In various instances of the aforementioned embodi-ments, at least one indication of success and one indication of failure are associated with one of the plurality of solu-tions, and scoring, by the processing device, the one of the plurality of solutions relative to the indication of the network element malfunction. In some instances of the aforemen-tioned embodiments, the first data is one of: an identification of a hardware used by the user; an indication of a software used by the user, or an indication of a cloud service used by the user. In various instances of the aforementioned embodi-ments, the first data is one of: a time that the network element malfunction began, a time the network element malfunction was reported, activity of the user prior to the network element malfunction, or a characterization of the network element malfunction from the user. In some cases, the characterization of the network element malfunction from the user is one of: an indication from the user that the network element malfunction is a hardware malfunction, an indication from the user that the network element malfunc-tion is a software malfunction, and an indication from the user that the network element malfunction is a downstream provider failure.

Other embodiments provide network incident systems. The network incident systems include: at least one proces-sor, a memory, and a database. The database includes a catalog of solutions for network element malfunctions, where each of the solutions is related to one or more prior incidents of network element malfunctions, where each of the incidents is related to one or more incident tags, and where each of the incident tags includes an element describ-ing an aspect of the network element malfunction for the particular incident to which the incident tag is related. The memory includes instructions executable by the at least one processor to: receive a new incident via a network; access a plurality of the solutions from the database; score each of the plurality of solutions from the database, where the score represents a similarity between the incident tags related to the respective one of the plurality of solutions and data included with the new incident; select a subset of the plurality of solutions based upon the scores of each of the plurality of solutions; and provide the subset of the plurality of solutions to the user.

In some instances of the aforementioned embodiments, the incident tags related to the respective one of the plurality of solutions include one or more of: a time that the network element malfunction began, a time the network element malfunction was reported, activity of the user prior to the network element malfunction, and/or a characterization of the network element malfunction from the user. In various cases, the characterization of the network element malfunc-tion from the user is one of: an indication from the user that the network element malfunction is a hardware malfunction, an indication from the user that the network element mal-function is a software malfunction, or an indication from the user that the network element malfunction is a downstream provider failure.

In various instances of the aforementioned embodiments, each of the solutions is further related to an instance, and each instance is related to one or more instance tags. In such instances, the score represents a similarity between both the incident tags and the instance tags related to the respective one of the plurality of solutions and data included with the new incident. In some cases, the instance tags related to the respective one of the plurality of solutions includes one or more of: an identification of a hardware used by the user; an indication of a software used by the user, and/or an indication of a cloud service used by the user. In various cases, each of the solutions is further related a validity data representing prior successes of the respective one of the plurality of solutions. In such instances, the score represents a similarity between both the incident tags and the instance tags related to the respective one of the plurality of solutions and data included with the new incident multiplied by the validity.

In some instances of the aforementioned embodiments, each of the solutions is further related a validity data representing prior successes of the respective one of the plurality of solutions. In such instances the score represents a similarity between the incident tags instance tags related to the respective one of the plurality of solutions and data included with the new incident multiplied by the validity. In some cases, the instructions are further executable by the at least one processor to: receive an indication from a user of success with a respective one of the subset of the plurality of solutions; and increase the validity data related to the respective one of the subset of the plurality of solutions. In various cases, the instructions are further executable by the at least one processor to: receive an indication from a user of failure with a respective one of the subset of the plurality of solutions; and decrease the validity data related to the respective one of the subset of the plurality of solutions.

Yet other embodiments provided non-transitory computer-readable storage medium embodying a set of instructions, which when executed by one or more processing resources of a computer system, causes the one or more processing resources to perform one or more of the methods discussed herein.

Turning to FIG. 1A, network architecture 100 is shown in accordance with some embodiments. In the context of network architecture 100, a network incident solutions control processor 150 is communicably coupled to endpoint devices 106-1, 106-2, . . . , 106-N via a network 102. Network incident solutions control processor 150 may provide a cloud-based service sourcing a variety of services via network 102. In some cases, the cloud-based security service may be implemented within a public cloud, a private cloud or a hybrid cloud. Based upon the disclosure provided herein, one of ordinary skill in the art will recognize a variety of network architectures in which network incident solutions control processor 150 may be deployed.

Network incident solutions control processor 150 may include one or more processors and/or circuitry implementing processing functions provided by network incident solutions control processor 150. Network incident solutions control processor 150 is coupled to a memory 152 that includes instructions executable by network incident solutions control processor 150 to perform one or more of the processing functions provided by network incident solutions control processor 150. In addition, network incident solutions control processor 150 is coupled to an incident database 155 that includes incident data. The incident data is a catalog of information about network element malfunctions including solutions for the cataloged network element malfunctions.

Endpoint devices 106-1, 106-2 . . . 106-N (which may be collectively referred to as endpoint devices 106, and may be individually referred to as endpoint device 106 herein) associated with network 102 may include, but are not limited to, personal computers, smart devices, web-enabled devices, hand-held devices, laptops, mobile devices, and the like. In some embodiments, network incident solutions control processor 150 may interact with users 104-1, 104-2 . . . 104-N (which may be collectively referred to as users 104, and may be individually referred to as a user 104 herein) through network 102 via their respective endpoint devices 106, for example, when interacting to mitigate a network element malfunction, a user 104 may be asked a variety of questions about the time and circumstance of the malfunction which user 104 enters via their respective endpoint device.

An automated incident monitor 122 (e.g., automated incident monitor 122-1, automated incident monitor 122-2, and automated incident monitor 122-N) is associated with respective ones of endpoint devices 106. In some cases, automated incident monitor 122 is an application operating on a respective endpoint device 106 or on an device forming part of network 102 such as, for example, a server, firewall, or cloud service machine. Automated incident monitor 122 is configured to detect malfunctions with the device on which it is executing, applications executing on the device on which it is executing, and/or with other devices and/or services included in or supported as part of network 102 and with which automated incident monitor 122 has vision. One or more automated incident monitors 122 (e.g., automated incident monitor 122-N+1) may be executed by respective network devices and or cloud services included and/or supported as part of network 102. Such automated incident monitors 122 are configured to detect malfunctions with the device on which it is executing, applications executing on the device on which it is executing, and/or with other devices and/or services included in or supported as part of network 102 and with which automated incident monitor 122 has vision. Based upon the disclosure provided herein, one of ordinary skill in the art will recognize a variety of implementations of automated incident monitor 122 that may be used in relation to different embodiments. In operation, when automated incident monitor 122 detects a network element malfunction, it generates an incident alert that is sent to network incident solutions control processor 150.

Those skilled in the art will appreciate that, network 102 can be a wireless network, a wired network or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

As described in further detail below, network incident solutions control processor 150 can maintain information regarding network element malfunctions catalogued by, inter alia, time, grouping with other similar located device types, endpoint device type, operating system type, user characterization of the malfunction, and/or potential solutions.

Figure 1B:
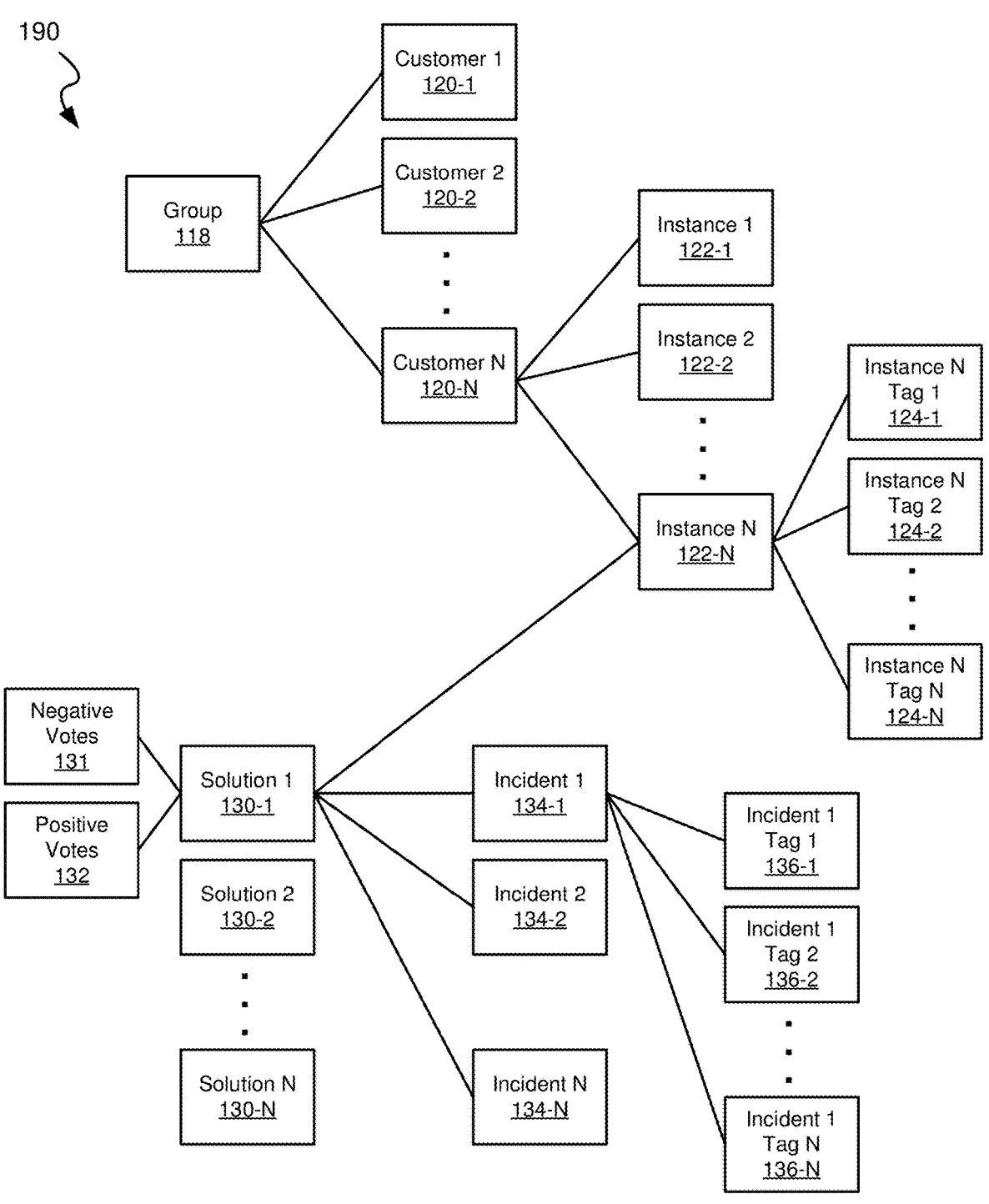

Turning to FIG. 1B, one embodiment of incident database 155 is shown. In this embodiment, incident database 155 includes a number of incidents 134 (e.g., incident 1 134-1, incident 2 134-2, . . . , incident N 134-N) of network element malfunctions that have been cataloged. Each incident 134 is associated with zero or more incident tags 136 (e.g., incident tag 1 136-1, incident tag 2 136-2, . . . , incident tag N 136-N). Such incident tags 136 are discrete identification information about the particular incident including, but not limited to, time started, time ended, activity of the user prior to the incident, network transactional information about the incident, and/or user characterization of the incident. Such user characterization of the incident may include, but is not limited to, an indication of user's belief that the problem is a hardware malfunction, software malfunction, and/or downstream provider failure. Based upon the disclosure provided herein, one of ordinary skill in the art will appreciate a variety of other discrete identification information and/or user characterizations that may be included as incident tags 136 in accordance with different embodiments.

In addition, each incident 134 is associated with a solution 130 (e.g., solution 1 130-1, solution 2 130-2, . . . , solution N 130-N) that was previously identified as capable of resolving the network element malfunction corresponding to the particular incident 134. Each solution 130 is associated with a number of negative votes 131 and positive votes 132. Negative votes 131 and positive votes 132 are votes received from users applying the respective solution 130 to a new incident. When the user experiences success in resolving a network element malfunction corresponding to the new incident 134 by applying the solution 130, positive votes 132 are increased by one. Alternatively, when the user experiences failure in resolving a network element malfunction corresponding to the new incident 134 by applying the solution 130, negative votes 131 are increased by one.

Each solution 130 is also associated with an instance 122 (e.g., instance 1 122-1, instance 2 122-2, . . . , instance N 122-N) to which the solution 130 was applied. Instances 122 are hardware devices such as end point devices, servers, or other network devices; cloud services, software products, or the like that are associated with a particular customer 120. Based upon the disclosure provided herein, one of ordinary skill in the art will recognize a variety of hardware, software, processes, and/or services that may be identified as instances in accordance with different embodiments.

Each instance 122 includes zero or more instance tags 124 (e.g., instance tag 1 124-1, instance tag 2 124-2, . . . , instance tag N 124-N). Such instance tags 124 are discrete identification information about the particular instance including, but not limited to, environment details, hardware version details, software version details, and/or the like. Based upon the disclosure provided herein, one of ordinary skill in the art will appreciate a variety of other discrete identification information that may be included as instance tags 124 in accordance with different embodiments.

A number of different customers 120 (e.g., customer 1 120-1, customer 2 120-2, . . . , customer N 120-N) may be included in the same organization or group 118. Further, while not shown, there may be further nesting where there are super-groups each formed of one or more groups 118. Based upon the disclosure provided herein, one of ordinary skill in the art will recognize a variety of organizations of groups, customers, and instances that may be used in relation to different embodiments.

In operation, when a user 104 experiences a network element malfunction while using their endpoint device 106, they send an incident alert to network incident solutions control processor 150 via network 102. Alternatively, when an automated incident monitor detects a network element malfunction, it similarly sends an incident alert to network incident solutions control processor 150 via network 102. Such an incident alert may be an electronic request provided by, for example, a web portal in the case of a user or from any type of communication method where an automated incident monitor is reporting the incident alert. Based upon the disclosure provided herein, one of ordinary skill in the art will recognize a variety of mechanisms that may be used by a user and/or automated incident monitor to send an incident alert and by which an incident alert can be received in accordance with different embodiments.

When an incident alert has been received, metadata associated with associated with the device, service, and/or software application associated with the incident that corresponds to the incident alert is received by network incident solutions processor 150. This may be received as part of the incident alert and/or after the incident alert has been received upon solicitation from either user 104 or automated incident monitor 122 that reported the incident alert. In some cases, this metadata includes information about the instance being used by user 104 and/or about the network element malfunction or incident being reported. Such metadata may include, but is not limited to, the group or customer with which user 104 and/or endpoint device 106 is associated, the make and model of endpoint device 106 being used, type and version of application and/or operating system being used by the device associated with the incident alert, downstream provider, and/or network transactional information. Network incident solutions control processor 150 also time stamps the incident with the current time.

Network incident solutions control processor 150 provides a request to user 104 associated with a device, application, or cloud service that is the subject of the received incident alert via network 102 asking for a general explanation of the network element malfunction. This general explanation is controlled by user 104 who is provided with various selections and/or prompts to help user 104 think of the relevant information. In addition, user 104 is given a free form area to write additional information that user 104 thinks is relevant to the current network element malfunction. The information requested from user 104 may include, but is not limited to, the approximate time of the first indication of the network element malfunction; and steps taken by user 104 to mitigate the network element malfunction; and/or steps taken by user 104 prior to the first indication of the network element malfunction. Based upon the disclosure provided herein, one of ordinary skill in the art will recognize other information that may be requested from user 104.

User 104 is additionally presented with a selection tool by which user 104 is asked to select their belief of what is causing the network element malfunction. User 104 may select, for example, to characterize whether user 104 perceives the network element malfunction they are reporting is caused by, for example, a hardware malfunction, a software malfunction, and/or a downstream provider failure. Further, user 104 may be given a free form where the user 104 can use natural language to describe what they think is cause of the network element malfunction. Based upon the disclosure provided herein, one of ordinary skill in the art will recognize a variety of requests for causation that may be made to user 104 in accordance with different embodiments.

Network incident solutions control processor 150 determines whether user 104 has responded to the various requests that have been made and if the metadata surrounding the incident has been received. Where the information has been received, a new incident 134 is stored to incident database 155 where it is cataloged by network incident solutions control processor 150 by associating it with zero or more incident tags 136. Again, such incident tags 136 are discrete identification information about the particular incident including, but not limited to, time started, time ended, activity of user 104 prior to the incident, network transactional information about the incident, and/or characterization of the incident from user 104. Such user characterization of the incident may include, but is not limited to, an indication of user's belief that the problem is a hardware malfunction, software malfunction, and/or downstream provider failure. All of the aforementioned is parsed from the information received from the user and/or the metadata. Based upon the disclosure provided herein, one of ordinary skill in the art will appreciate a variety of other discrete identification information and/or user characterizations that may be included as the incident tags in accordance with different embodiments.

Next, network incident solutions control processor 150 scores various prior solutions 130 included in incident database 155 based upon, for example, a weighted proximity to the current incident to yield a weighted score for each previous solution 120 in incident database 155. The scoring is intended to rank previous solutions 120 that would be most likely to solve the current network element malfunction based upon similarities that the prior solutions 120 had to the instance, instance tags, incident, and incident tags between the prior solution and the current network element malfunction. One example of such a scoring process is described in FIG. 3 below. That said, one of ordinary skill in the art will recognize a variety of approaches for scoring similarities between prior solutions and current network element malfunctions that may be used in relation to different embodiments. User 104 is provided with the highest scored solutions 120, and given an opportunity to try one or more of the proposed solutions 120 to see if they work.

As user 104 attempts one or more of the proposed solutions 120, user 104 ranks the each offered solution 120 by whether the solution 120 worked or not and/or provides a new solution that user 104 conceived if none of the proposed solutions 120 worked. Where the first of the proposed solutions 120 worked user 104 will only vote on that solution 120. Where, on the other hand, user 104 attempts multiple solutions 120 in sequence they will likely only vote success on one of the solutions 120 and failure on the others. Network incident solutions control processor 150 determines whether user 104 has provided the feedback on the success or failure of the solutions 120 provided.

Once the votes of success or failure and/or new solution 120 are received from user 104 by network incident solutions control processor 150, these votes are added to prior votes for the corresponding solutions 120 (i.e. negative votes 131 or positive votes 132 are incremented for a given solution) such that the solutions 120 maintained in incident database 155 include feedback from one or more users 104 about the value of the given solutions 120. Thus, for example, where user 104 attempted three proposed solutions 120 and one worked, one success vote and two failure votes are received each for a corresponding solution.

Network incident solutions control processor 150 determines whether one of the proposed solutions 120 worked. Where one of the proposed solutions 120 worked, the solution 120 that worked is linked with the newly created incident and the instance where the problem was detected in incident database 155. Alternatively, where no pre-existing solution 120 worked, but user 104 identified their own solution that worked, that new solution is reported by user 104 and entered in incident database 155 and linked to the newly created incident and corresponding instance. This new solution is then considered with the next network element malfunction is reported by another user 104.

Figure 2:
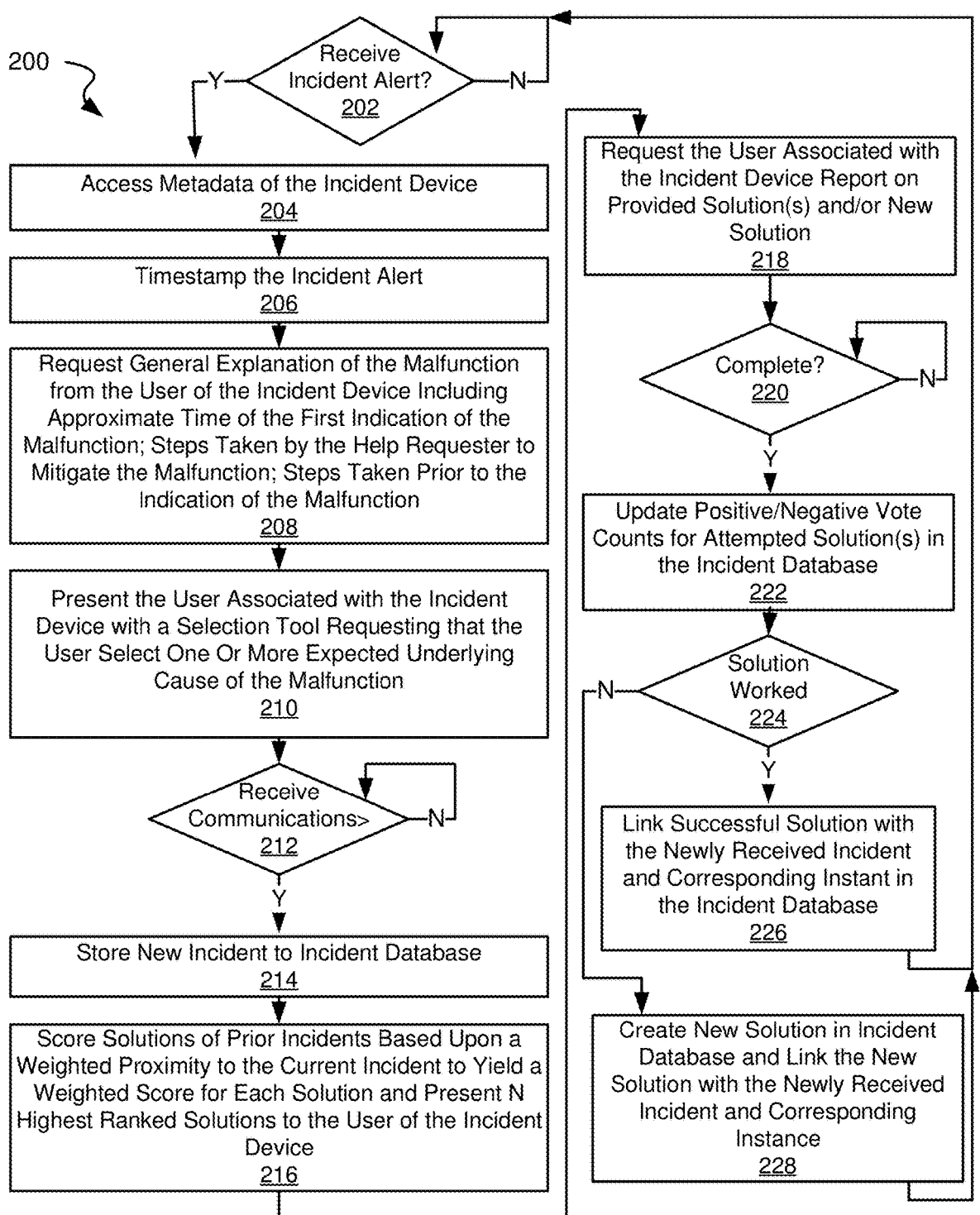
FIG. 2 is a flow diagram showing a method in accordance with various embodiments for cataloging network element malfunctions and proposing solutions to network element malfunctions.

Turning to FIG. 2, a flow diagram 200 shows a method in accordance with various embodiments for cataloging network element malfunctions and proposing solutions to network element malfunctions. Following flow diagram 200, it is determined whether an incident alert has been received from either an automated incident monitor or a user (block 202). An incident alert may be an electronic request received, for example, via a web portal where a user is reporting or from any type of communication method where an automated incident monitor is reporting. Based upon the disclosure provided herein, one of ordinary skill in the art will recognize a variety of mechanisms that may be used by a user or an automated incident monitor to indicate an incident alert and by which an incident alert can be received in accordance with different embodiments.

When an incident alert has been received (block 202), metadata associated with the device, service, and/or software application associated with the incident that corresponds to the incident alert is accessed (block 204). This may be received as part of the incident alert and/or after the incident alert has been received upon solicitation from either the user or automated incident monitor that reported the incident alert. In some cases, this metadata includes information about the instance associated with the incident alert and/or about the network element malfunction or incident being reported. Such metadata may include, but is not limited to, the group or customer with which the user and/or endpoint device is associated, the make and model of the endpoint device being used by the user, type and version of application and/or operating system being used by the device associated with the incident alert, downstream provider, and/or network transactional information. The incident alert is also time stamped with the current time (block 206).

A request is provided to a user of the device associated with the incident alert asking for a general explanation of the network element malfunction (block 208). This general explanation is controlled by the user who is provided with various selections and/or prompts to help them think of the relevant information. In addition, the user is given a free form area to write additional information that they think is relevant to the current network element malfunction. The information requested from the user may include, but is not limited to, the approximate time of the first indication of the network element malfunction; and steps taken by the user to mitigate the network element malfunction; and/or steps taken prior to the first indication of the network element malfunction. Based upon the disclosure provided herein, one of ordinary skill in the art will recognize other information that may be requested from the user.

The user is additionally presented with a selection tool by which they are asked to select their belief of what is causing the network element malfunction (block 210). They may select, for example, to characterize whether they perceive the network element malfunction they are reporting is caused by, for example, a hardware malfunction, a software malfunction, and/or a downstream provider failure. Further, they may be given a free form where the user can use natural language to describe what they think is cause of the network element malfunction. Based upon the disclosure provided herein, one of ordinary skill in the art will recognize a variety of requests for causation that may be made to the user in accordance with different embodiments.

It is determined whether the user has responded to the various requests that have been made and if the metadata surrounding the incident has been received (block 212). Where the information has been received (block 212), a new incident is stored to an incident database where it is cataloged by associating it with zero or more incident tags. Such incident tags are discrete identification information about the particular incident including, but not limited to, time started, time ended, activity of the user prior to the incident, network transactional information about the incident, and/or user characterization of the incident. Such user characterization of the incident may include, but is not limited to, an indication of user's belief that the problem is a hardware malfunction, software malfunction, and/or downstream provider failure. All of the aforementioned is parsed from the information received from the user and/or the metadata. Based upon the disclosure provided herein, one of ordinary skill in the art will appreciate a variety of other discrete identification information and/or user characterizations that may be included as the incident tags in accordance with different embodiments.

Next, various prior solutions included in the incident database are scored based upon, for example, a weighted proximity to the current incident to yield a weighted score for each previous solution in the incident database (block 216). The scoring is intended to rank previous solutions based upon which would be most likely to solve the current network element malfunction based upon similarities that the prior solutions had to the instance, instance tags, incident, and incident tags between the prior solution and the current network element malfunction. One example of such a scoring process is described in FIG. 3 below. That said, one of ordinary skill in the art will recognize a variety of approaches for scoring similarities between prior solutions and current network element malfunctions that may be used in relation to different embodiments. The user is provided with the highest scored solutions, and given an opportunity to try one or more of the proposed solutions to see if they work.

As the user attempts one or more of the proposed solutions, they rank the offered solution by whether the solution worked or not and/or provide a new solution that they conceived where none of the proposed solutions worked (block 218). Where the first of the proposed solutions worked they will only vote on that solution. Where, on the other hand, the user attempts multiple solutions they will likely only vote success on one of the solutions and failure on the others. It is determined whether the user has provided the feedback on the success or failure of the solutions provided (block 220).

Once the votes of success or failure and/or new solution are received from the user (block 220), these votes are added to prior votes for the corresponding solutions such that the solutions maintained in the incident database include feedback from one or more users about the value of the given solutions (block 222). Thus, for example, where the user attempted three proposed solutions and one worked, one success vote and two failure votes are received each for a corresponding solution. Alternatively, where the user attempted three proposed solutions and none worked, but found their own solution, three failure votes are received each for a corresponding solution and the new solution is received.

It is determined whether one of the proposed solutions worked (block 224). Where one of the proposed solutions worked (block 224), the solution that worked is linked with the newly created incident and the instance where the problem was detected in the incident database (block 226). Alternatively, where no pre-existing solution worked, but the user identified their own solution that worked (block 224), that new solution is reported by the user and entered in the incident database and linked to the newly created incident and corresponding instance (block 228). This new solution is then considered with the next network element malfunction is reported by another user.

Figure 3:
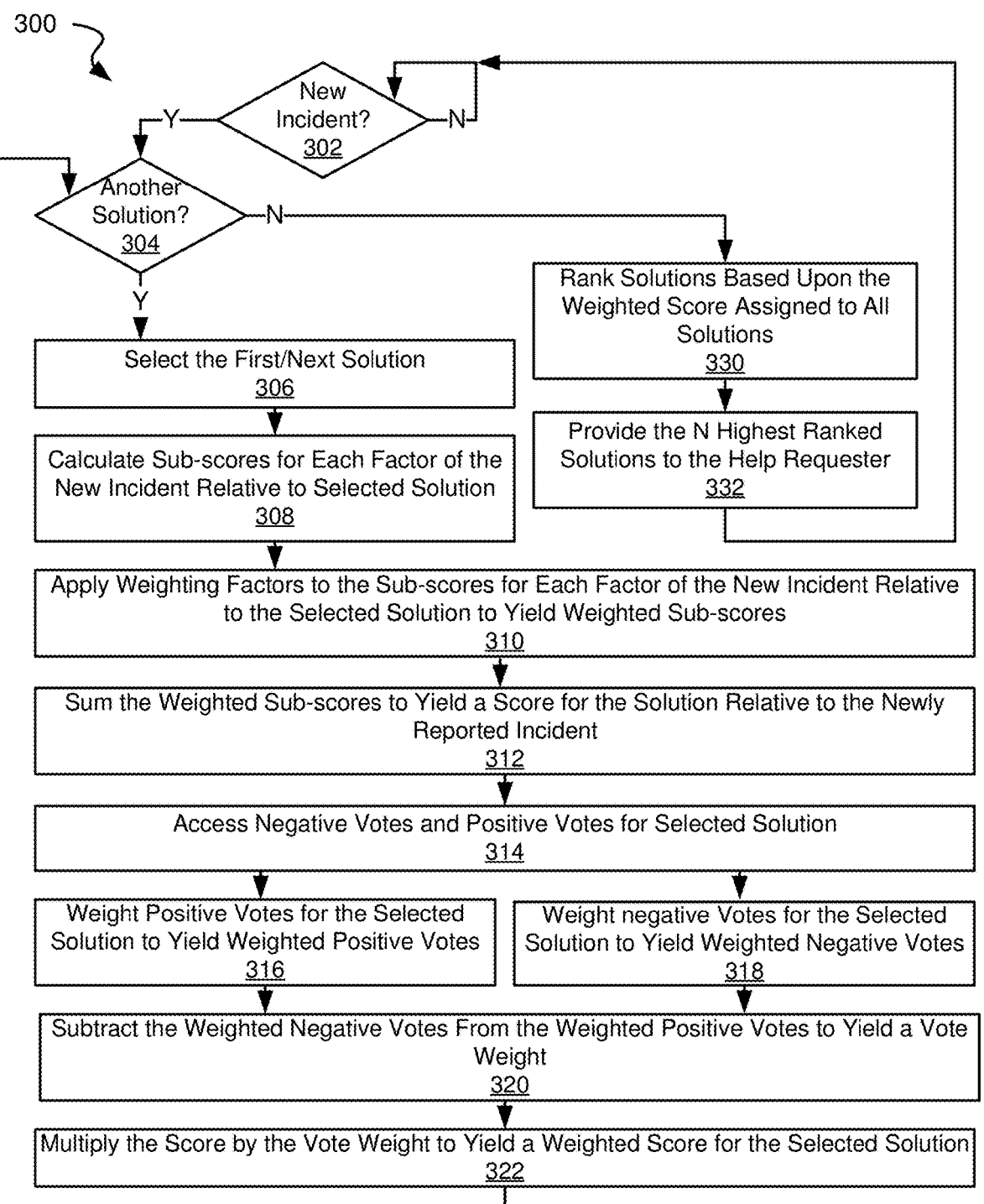
FIG. 3 is a flow diagram showing a method in accordance with some embodiments for ranking solutions for proposal in relation to a received indication of a network element malfunction in accordance with some embodiments.

Turning to FIG. 3, a flow diagram 300 shows a method in accordance with some embodiments for ranking solutions for proposal in relation to a received indication of a network element malfunction. Following flow diagram 300, it is determined if a new network element malfunction has been reported (block 302). Where a network element malfunction has been reported (block 302), it is determined whether it has been compared with every prior solution in an incident database (block 304). Where all solutions have not yet been considered and scored relative to the newly received incident of new network element malfunction (block 304), the first or next solution to be scored is selected from the incident database (block 306).

For the selected solution, a sub-score for each factor relative to the newly reported network element malfunction is calculated (block 308). In one embodiment, the factors and sub-scores are as follow:

(a) If the instance (e.g., endpoint device, server, cloud service, or the like) that is identified with the newly reported network element malfunction is the same as the instance identified with the selected solution then a variable Instance Overlap is set equal to True.

(b) How close (Instance Locality or n) the instance that is identified with the newly reported network element malfunction is to the instance associated with the selected solution. Where, for example, the instance that is identified with the newly reported network element malfunction is from the same customer as the instance associated with the selected solution, then n is set equal to 0. As another example, where the instance that is identified with the newly reported network element malfunction is from the same group but not the same customer as the instance associated with the selected solution, then n is set equal to 1. As another example, where the instance that is identified with the newly reported network element malfunction is from the same super-group but not the same group as the instance associated with the selected solution, then n is set equal to 2. This increase in the value of n continues as the distance between the instance that is identified with the newly reported network element malfunction and that of the selected solution increases.

(c) The fraction (Instance Tag Overlap) of instance tags shared between the instance that is identified with the newly reported network element malfunction and that of the solution is calculated as the number of instance tags of the selected solution divided by the total number of instance tags of the selected solution.

(d) The fraction (Incident Tag Overlap) of incident tags shared between the instance that is identified with the newly reported network element malfunction and that of the solution is calculated as the number of incident tags of the selected solution divided by the total number of incident tags of the selected solution.

(e) If a selected metric is similar between the incident that is identified with the newly reported network element malfunction and that of the solution then a variable Metric Type is set equal to True. Such metrics include, but are not limited to, CPU usage, bandwidth in/out of a server, or whether a given service is running on a machine. Based upon the disclosure provided herein, one of ordinary skill in the art will recognize a variety of metrics that may be collected and included as either instance tags or incident tags in accordance with different embodiments.

(f) Whether the application identified with the newly reported network element malfunction is the same as that of the selected solution then a variable Application Type Overlap is set equal to True.

(g) The inverse of the time proximity (1/t) of the newly reported network element malfunction from the incident associated with the selected solution is calculated.

In some embodiments, the sub-score is calculated using a number of factors based upon comparison of the newly reported network element malfunction to the selected solution. Such factors include:

(h) Whether the instance (e.g., endpoint device, server, cloud service, or the like) that is identified with the newly reported network element malfunction is the same as the instance identified with the selected solution then a variable Instance Overlap is set equal to True.

(i) How close (Instance Locality or n) the instance that is identified with the newly reported network element malfunction is to the instance associated with the selected solution. Where, for example, the instance that is identified with the newly reported network element malfunction is from the same customer as the instance associated with the selected solution, then n is set equal to 0. As another example, where the instance that is identified with the newly reported network element malfunction is from the same group but not the same customer as the instance associated with the selected solution, then n is set equal to 1. As another example, where the instance that is identified with the newly reported network element malfunction is from the same super-group but not the same group as the instance associated with the selected solution, then n is set equal to 2. This increase in the value of n continues as the distance between the instance that is identified with the newly reported network element malfunction and that of the selected solution increases.

(j) The fraction (Instance Tag Overlap) of instance tags shared between the instance that is identified with the newly reported network element malfunction and that of the solution is calculated as the number of instance tags of the selected solution divided by the total number of instance tags of the selected solution.

(k) The fraction (Incident Tag Overlap) of incident tags shared between the instance that is identified with the newly reported network element malfunction and that of the solution is calculated as the number of incident tags of the selected solution divided by the total number of incident tags of the selected solution.

(l) Metric type (Metric Type Overlap)

(m) Whether the application identified with the newly reported network element malfunction is the same as that of the selected solution then a variable Application Type Overlap is set equal to True.

(n) The inverse of the time proximity (1/t) of the newly reported network element malfunction from the incident associated with the selected solution is calculated.

Weighting factors for each above mentioned sub-scores is applied to yield weighted sub-scores (block 310) and all of the weighted sub-scores are summed to yield a score for the selected solution relative to the reported incident (block 312). The weighting factors applied to the sub-scores is used to vary the relevance of the solution to its corresponding positive votes and negative votes. The weighting factors are as follow: a Time Weighting Factor, an Application Overlap Weighting Factor, a Metric Weighting Factor, a Weighted Incident Tag Factor, a Weighted Instance Tag Factor, and a Location Weighing Factor. These weighting factors are each programmable to allow for tuning the score algorithm. In one particular embodiment, all of the aforementioned weighting factors are one. Using the aforementioned sub-scores for the factors, the score is calculated in accordance with the following pseudocode:

```
Score Calculation{
    Initialize score to 0;
    If (Instance Overlap == True){
        add a Weighted Instance Overlap Factor to the score;
    }
    multiply a Location Weighing Factor by 1/2ⁿ to Yield a Weighted
    Location; add Weighted Location to the score;
    multiply Instance Tag Overlap by an Instance Tag Weighting Factor to
Yield Weighted Instance Tag;
        add Weighted Instance Tag Factor to the score;
    multiply Incident Tag Overlap by an Instance Tag Weighting Factor to
Yield Weighted Incident Tag;
        add Weighted Incident Tag Factor to the score;
    If(Metric Type Overlap == True){
        add a Metric Weighting Factor to the score;
    }
    If (Application Type Overlap == True){
        add an Application Overlap Weighting Factor to the score;
    }
    multiply Time Proximity by a Time Weighting Factor to Yield a
    Weighted Proximity; add Weighted Proximity to the score;
}
```

The above mentioned pseudocode can be expressed as:

$$score = \sum_{factors} w_{factor} \times subscore_{factor}$$

Continuing with flow diagram 300, negative votes and positive votes for the selected solution are accessed from the incident database (block 314). The positive votes are weighted by a positive weighting factor (block 316) and the negative votes are weighted by a negative weighting factor (block 318). These weighting factors are designed to vary the relevance of positive votes to negative votes. The weighted negative votes are subtracted from the weighted positive votes to yield a vote weight (block 320). The previously calculated score is multiplied by the vote weight to yield a weighted score for the selected solution (block 322). In this way each solution is scored by a number of factors to determine similarity with the newly reported network element malfunction, and the weighted by a historical value of the particular solution. The weighted score may be expressed as:

$$score = \left( \sum_{factors} w_{factor} \times subscore_{factor} \right) \times (w_{pcs} \times n_{pos} - w_{neg} \times n_{neg}),$$

Where $n_{pos}$ is the negative weighting factor, $w_{pos}$ is the positive weighting factor, $n_{pos}$ is the number of positive votes for the selected solution, and nneg is the number of negative votes for the solution. This process of scoring solutions continues until all solutions in the incident database have been scored relative to the newly reported network element malfunction.

Once all solutions have been scored relative to the newly reported network element malfunction (i.e., no other solutions remain) (block 304), the solutions are ranked relative to each other based upon the weighted score assigned to each (block 330), and the N highest ranked solutions are provided to the user as possible solutions the newly reported network element malfunction (block 332).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for distributing network intelligence, the method comprising:

receiving, by a processing device, an indication of a network element malfunction, the indication including at least a first data factor and a second data factor associated with the network element malfunction, the first data factor comprising at least one of a hardware identifier a software identifier, a cloud service identifier or a time associated with the malfunction;

accessing a plurality of solutions stored in an incident database, each solution being associated with a) incident tags comprising discrete structured fields including user-supplied characterization of a prior malfunction and one or more identifiers selected from hardware identifiers, software identifiers, or cloud services in prior occurrences of the solution, and b) instance tags comprising information identifying particular hardware, software, or cloud services encountered in prior occurrences of the solution;

for each solution in the subset of the plurality of solutions, calculating a similarity score relative to the malfunction by:

generating, for each factor in the incident tags, a respective similarity sub-scores based on a comparison of the first and second data factors to corresponding information in the incident tags;

applying malfunction-specific weighting factors to the similarity sub-scores summing the weighted similarity sub-scores to produce the similarity score;

accessing, for each of the plurality of solutions, stored positive votes and stored negative votes maintained in the incident database, and applying vote weighting factors to the positive votes and negative votes to generate vote weighted adjustment values;

selecting a subset of the plurality of solutions based upon of final weighted scores;

generating a ranked subset of the plurality of solutions based on the final weighted scores;

providing the ranked subset to a user via a network;

receiving from the user, at least one indication of success for one of the solutions; and updating, in the incident database, a validity datum associated with the solution to which the indication of success corresponds, the validity datum being persistently stored and used in subsequent similarity scoring, wherein the at least one indication of success in the incident database associated with the solution to which the indication of success corresponds includes a number greater than one that represents a count of how many times the solution has been used with success.

2. The method of claim 1, wherein at least one indication of success and one indication of failure are associated with one of the plurality of solutions, and wherein scoring, by the processing device, the one of the plurality of solutions relative to the indication of the network element malfunction.

3. The method of claim 1, wherein the first data is selected from a group consisting of: an identification of a hardware used by the user; an indication of a software used by the user, and an indication of a cloud service used by the user.

4. The method of claim 1, wherein the first data is selected from a group consisting of: a time that the network element malfunction began, a time the network element malfunction was reported, activity of the user prior to the network element malfunction, and a characterization of the network element malfunction from the user.

5. The method of claim 4, wherein the characterization of the network element malfunction from the user is selected from a group consisting of: an indication from the user that the network element malfunction is a hardware malfunction, an indication from the user that the network element malfunction is a software malfunction, and an indication from the user that the network element malfunction is a downstream provider failure.

6. A network incident system, the network incident system comprising:

at least one processor;

a database storing a catalog of solutions for network element malfunctions, each solution being associated with a) incident tags comprising discrete structured fields including user-supplied characterization of a prior malfunction and one or more identifiers selected from hardware identifiers, software identifiers, or cloud services in prior occurrences of the solution, and b) instance tags comprising information identifying particular hardware, software, or cloud services encountered in prior occurrences of the solution; and a memory, wherein the memory includes instructions executable by the at least one processor to:

receive a new incident via a network an indication of a network element malfunction, the indication including at least a first data factor and a second data factor associated with the network element malfunction, the first data factor comprising at least one of a hardware identifier, a software identifier, cloud service identifier or a time associated with the malfunction;

access a plurality of the solutions from the database;

for each accessed solution, calculate a similarity score representing a similarity between factors represented in the incident tags and data included with the new incident by:

generating similarity sub-scores based on comparisons between malfunction related factors of the new incident and corresponding factors stored in the incident tags;

applying malfunction specific weighting factors to the sub-scores;

summing the weighted similarity sub-scores to produce the similarity score;

access stored positive votes and stored negative votes associated with each solution, apply vote weighting factors to the positive votes and the negative votes to generate vote weighted adjustment values and apply the adjustment values to the similarity score to generate a final weighted score for each solution;

select a subset of the plurality of solutions based upon the weighted scores rank the subset of the plurality of solutions based on their final weighted scores;

provide the ranked subset to a user;

receive from the user an indication of success for a respective one of the solutions;

update validity data associated with the respective solution, the validity data being persistently stored in the database and used during subsequent scoring, wherein the at least one indication of success in the incident database associated with the solution to which the indication of success corresponds includes a number greater than one that represents a count of how many times the solution has been used with success.

7. The network incident system of claim 6, wherein the incident tags related to the respective include one or more of: a time that the network element malfunction began, a time the network element malfunction was reported, activity of the user prior to the network element malfunction, or a characterization of the network element malfunction from the user.

8. The network incident system of claim 7, wherein the characterization of the network element malfunction from the user is selected from a group consisting of: an indication from the user that the network element malfunction is a hardware malfunction, an indication from the user that the network element malfunction is a software malfunction, and an indication from the user that the network element malfunction is a downstream provider failure.

9. The network incident system of claim 6, wherein each of the solutions is further related to an instance, and wherein each instance is related to one or more instance tags, and wherein the score represents a similarity between both the incident tags and the instance tags related to the respective one of the plurality of solutions and data included with the new incident.

10. The network incident system of claim 9, wherein the instance tags related to the respective one of the plurality of solutions includes one or more of: an identification of a hardware used by the user; an indication of a software used by the user, or an indication of a cloud service used by the user.

11. The network incident system of claim 9, wherein each of the solutions is further related a validity data representing prior successes of the respective one of the plurality of solutions, and wherein the score represents a similarity between both the incident tags and the instance tags related to the respective one of the plurality of solutions and data included with the new incident multiplied by the validity.

12. The network incident system of claim 6, wherein the instructions are further executable by the at least one processor to:

receive an indication from a user of failure with a respective one of the subset of the plurality of solutions; and decrease the validity data related to the respective one of the subset of the plurality of solutions.

13. A non-transitory computer-readable storage medium embodying a set of instructions, which when executed by one or more processing resources of a computer system, causes the one or more processing resources to perform a method comprising:

receiving, by a processing device, an indication of a network element malfunction, the indication including at least a first data factor and a second data factor associated with the network element malfunction, the first data factor comprising at least one of a hardware identifier, a software identifier, cloud service identifier or a time associated with the malfunction;

accessing a plurality of solutions stored in an incident database, each solution being associated with a) incident tags comprising discrete structured fields including user-supplied characterization of a prior malfunction and one or more identifiers selected from hardware identifiers, software identifiers, or cloud services in prior occurrences of the solution, and b) instance tags comprising information identifying particular hardware, software, or cloud services encountered in prior occurrences of the solution;

for each solution in the subset of the plurality of solutions, calculating a similarity score relative to the malfunction by:

generating, for each factor in the incident tags, a respective similarity sub-scores based on a comparison of the first and second data factors to corresponding information in the incident tags;

applying malfunction-specific weighting factors to the similarity sub-scores;

summing the weighted similarity sub-scores to produce the similarity score;

accessing, for each of the plurality of solutions, stored positive votes and stored negative votes maintained in the incident database, and applying vote weighting factors to the positive votes and negative votes to generate vote weighted adjustment values;

selecting a subset of the plurality of solutions based upon of final weighted scores;

generating a ranked subset of the plurality of solutions based on the final weighted scores;

providing the ranked subset to a user via a network;

receiving from the user, at least one indication of success for one of the solutions; and updating, in the incident database, a validity datum associated with the solution to which the indication of success corresponds, the validity datum being persistently stored and used in subsequent similarity scoring, wherein the at least one indication of success in the incident database associated with the solution to which the indication of success corresponds includes a number greater than one that represents a count of how many times the solution has been used with success.

14. The non-transitory computer-readable storage medium of claim 13, wherein at least one indication of success and one indication of failure are associated with one of the plurality of solutions, and wherein scoring, by the processing device, the one of the plurality of solutions relative to the indication of the network element malfunction.

15. The non-transitory computer-readable storage medium of claim 13, wherein the first data is selected from a group consisting of: an identification of a hardware used by the user; an indication of a software used by the user, and an indication of a cloud service used by the user.

16. The non-transitory computer-readable storage medium of claim 13, wherein the first data is selected from a group consisting of: a time that the network element malfunction began, a time the network element malfunction was reported, activity of the user prior to the network element malfunction, and a characterization of the network element malfunction from the user.

* * * * *